United States Patent [19]

Scheidweiler

[11] Patent Number: 4,475,390

[45] **Date of Patent: * Oct. 9, 1984**

[54] SMOKE DETECTOR

[75] Inventor: Andreas Scheidweiler, Uerikon, Switzerland

[73] Assignee: Cerberus AG, Männedorf, Switzerland

[ * ] Notice: The portion of the term of this patent subsequent to May 24, 2000 has been disclaimed.

[21] Appl. No.: 476,996

[22] Filed: Mar. 21, 1983

Related U.S. Application Data

[63] Continuation-in-part of Ser. No. 257,784, Apr. 27, 1981, Pat. No. 4,384,488.

[30] Foreign Application Priority Data

May 9, 1980 [CH] Switzerland ........................ 3641/80

[51] Int. Cl.$^3$ ........................................... G01D 11/24

[52] U.S. Cl. ...................................... 73/431; 250/384

[58] Field of Search ............ 73/431; 98/41 R, 41 AV, 98/41 SV; 250/384, 385; 340/628, 629, 630

[56] References Cited

U.S. PATENT DOCUMENTS

| | | | |
|---|---|---|---|
| 1,319,526 | 10/1919 | Hauser | 98/41 AV |
| 2,489,011 | 11/1949 | Dahlin | 98/41 R |
| 2,791,170 | 5/1957 | Phillips et al. | 98/41 AV |
| 3,495,521 | 2/1970 | Foster | 98/41 R |
| 3,903,419 | 9/1975 | Lehsten | 250/284 |
| 3,908,957 | 9/1975 | Schutt | 340/629 |
| 4,220,862 | 9/1980 | Byrne | 250/385 |

FOREIGN PATENT DOCUMENTS

| | | | |
|---|---|---|---|
| 2430612 | 3/1980 | France | 340/629 |
| 5233797 | 2/1978 | Japan . | |
| 551057 | 5/1974 | Switzerland . | |
| 617037 | 9/1946 | United Kingdom | 98/40 |

OTHER PUBLICATIONS

Bulletin Des Schweizerichen Electrotechnischen Vereins, Band 43, No. 23, Nov. 1952, Meili; "Ionizations-Feuermelder" pp. 933–939.

Electronic Industrielle, No. 79, Dec. 1964, Henry, "La detection dlectronique des Incendies" pp. 437–441.

*Primary Examiner*—S. Clement Swisher

*Attorney, Agent, or Firm*—Werner W. Kleeman

[57] ABSTRACT

A smoke detector containing at least one smoke measuring chamber which possesses a mounting or socket plate having an upper surface intended to be mounted at the ceiling of a room or other appropriate area to be monitored and a housing enclosing the smoke measuring chamber and suspendingly secured at the socket plate. The housing possesses openings for the entry of the ambient air into the smoke measuring chamber. The smoke detector comprises a manually adjustable device by means of which it is possible to change the air entry opening in a manner such that the smoke detector can be accommodated to different environmental or ambient conditions, especially those containing different quantities of dust and other contaminants. A hood ring member, movably supported at the inside of a sleeve member of the smoke detector, can be selectively displaced in order to change the air entry openings.

9 Claims, 8 Drawing Figures

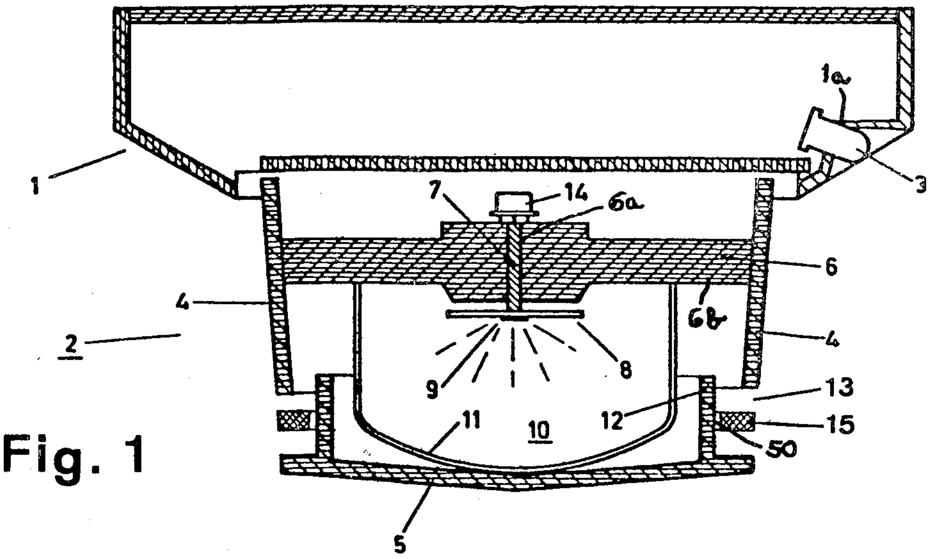
Fig. 1
Fig. 2
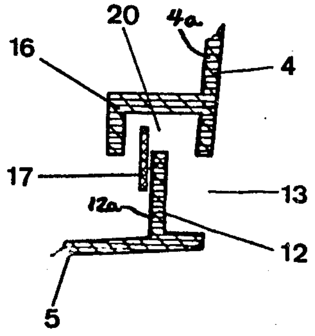
Fig. 3
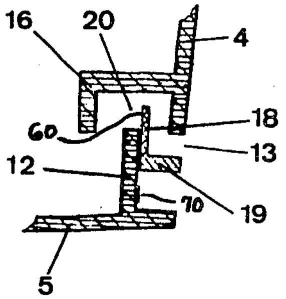

SMOKE DETECTOR

CROSS REFERENCE TO RELATED APPLICATION

This application is a continuation-in-part of U.S. application, Ser. No. 06/257,784, filed Apr. 27, 1981, now U.S. Pat. No. 4,384,488 entitled "Smoke Detector".

BACKGROUND OF THE INVENTION

The present invention relates to a new and improved construction of smoke detector.

Generally speaking, the smoke detector of the present development is of the type containing at least one smoke measuring chamber, which is provided with a socket or mounting plate having an upper surface intended to be mounted at the ceiling of a room or area to be monitored and a housing enclosing the smoke measuring chamber and suspendingly attached at the socket plate. The housing is provided with access or entry openings for the entry of the ambient air into the smoke measuring chamber.

During the detection of combustion processes or fires it is important to detect the same as early as possible, in order to prevent the occurrence of a great deal of damage by rapidly undertaking appropriate counteractive and fire fighting measures, i.e. placing into operation fire fighting equipment and personnel, as well as warning possibly endangered occupants early enough. Frequently toxic gases and vapors, which can endanger human life, occur at the incipient stages of fires, i.e. when there are present smouldering fires as opposed to open or licking flames.

For the purpose of detecting fires at an incipient stage there have been found to be particularly useful smoke detectors, since they are capable of responding to a parameter of a combustion process or fire which already occurs at an extremely early point in time. For a smoke detector or alarm to respond it is necessary that smoke, or stated in physical terms, a combustion aerosol enter the smoke detector. In this context transport problems with respect to the smoke i.e. aerosol particles or the like play an appreciable role. The mere occurrence of smoke at the site of the fire is not sufficient for response of the smoke detector and for triggering of an alarm. Additionally, it is necessary that an adequate quantity of smoke is transported into the measuring chamber of the smoke detector. Within the measuring chamber there can be then detected in conventional manner the smoke or aerosol particles, for instance by means of the scattered light (optical smoke detectors) occurring at a light beam emanating from a light source, or by means of the change in the current flow in an ionization chamber (ionization fire alarm), or also by other techniques, for instance measuring the change in the conductivity, the humidity or the ion density of the ambient air. The energy needed for transport of the smoke into the measuring chamber, in most instances, is furnished by the heat which evolves during oxidation.

In numerous patent publications both of the predominantly employed types of detectors are repeatedly modified, in order to accommodate them to special fields of application or special requirements. From the multiplicity of patents in this technology there are here only mentioned by way of example Swiss Pat. Nos. 264,020, 468,638, 508,251 and 551,057 relating to ionization fire alarms, and 417,405 and 592,932 relating to optical smoke detectors.

In the case of optical smoke detectors the measuring chamber is extensively closed, in order to suppress as much as possible the effect of spurious light. In order to eliminate the triggering of false alarms by light which penetrates through the smoke entry of access openings, there is provided a closure cover in the scattered light-smoke detector of Japanese Pat. No. 52-133 797, which automatically closes the smoke entry openings as soon as a signal delivered by a photodetector exceeds a predetermined threshold value. If the signal is caused by scattered light then there is suppressed an alarm and the smoke entry openings are automatically again opened, in order to place the smoke detector in its operationally preparatory state.

During the construction of ionization-smoke detectors it is essentially attempted to design the measuring chamber such that it is extensively open to the ambient atmosphere, in order to achieve unhindered entry of the combustion aerosols or the like. For instance, with a number of prior art constructions the measuring chamber is only separated from the external atmosphere by a grid-like hood or a hood possessing relatively large grid-like openings.

However, all of the described constructions possess the drawback that they are exposed to a pronounced extent to natural dust contamination. In order to eliminate this shortcoming it has been proposed retarding the air entry into the ionization chamber by the use of suitable means which brake the airflow or deflect the same, in order to cause the deposition of the dust or other contaminants before the same enters the actual measuring chamber. However, with this technique there is also rendered more difficult the entry of the combustion aerosols into the measuring chamber which must be detected, leading to an undesired reduction in the response sensitivity of the smoke detector.

An appreciable drawback of the heretofore known smoke detectors or alarms resides in the fact that for each field of application there must be developed specially designed smoke detectors or alarms, in order to ensure that when encountering different environmental conditions there will be guaranteed in each case an optimum entry of the combustion aerosols into the fire alarm. This results in complicated manufacturing techniques, an unnecessary large storage requirement and unnecessary exchange of the alarm inserts upon change of the ambient conditions at the alarm erection site (absence or occurrence of dust contamination danger and so forth).

SUMMARY OF THE INVENTION

Therefore with the foregoing in mind it is a primary object of the present invention to provide a new and improved construction of smoke detector which is not associated with the aforementioned drawbacks and shortcomings of the prior art constructions.

Another and more specific object of the present invention aims at overcoming the disadvantages of the heretofore known smoke detectors and, in particular, devising a smoke detector which can be accommodated in a most simple manner to different environmental conditions.

A further significant object of the present invention aims at rendering possible with a simple constructional design that the smoke detector, in the presence of the momentarily encountered environmental conditions, enables an optimum entry of combustion aerosols into the smoke measuring chamber while simultaneously optimumly preventing the entry of dust or other contaminants which may cause spurious alarm triggering.

Now in order to implement these and still further objects of the invention, which will become more readily apparent as the description proceeds, the smoke detector of the present development is manifested by the features that there is provided a manually adjustable device for changing the air entry or access openings.

According to a preferred embodiment of the invention the manually adjustable device is constructed such that the adjustment of the air entry openings only is possible from the inside of the fire alarm or from externally thereof only when using a special tool.

According to a further preferred embodiment of the invention the manually adjustable device is structured such that it alters the outer air access or entry openings of the fire alarm. Additional, likewise preferred constructional manifestations of the invention reside in structuring the manually adjustable device such that it changes the inner or internal air access openings or, however, by adjusting the manually adjustable device there can be simultaneously altered both the inner and outer air entry or access openings of the smoke detector.

A further preferred embodiment of the invention resides in constructing the manually adjustable device such that it can be infinitely or stepwise changed and that the setting or adjustment of such device can be read or otherwise visually discerned externally of the detector at a marker or position indicator or the like.

According to another extremely advantageous design, there is provided a stepwise adjustable hood ring member which is movably secured to the inside of a sleeve member of the smoke detector. This hood ring member can be selectively displaced in order to controllably alter the size of the air entry openings.

BRIEF DESCRIPTION OF THE DRAWINGS

The invention will be better understood and objects other than those set forth above, will become apparent when consideration is given to the following detailed description thereof. Such description makes reference to the annexed drawings. Throughout the various Figures there have been generally used the same reference characters to denote the same or analogous components, and wherein:

FIG. 1 is a cross-sectional view through a smoke detector or alarm where there can be altered the outer or external air entry or access openings;

FIG. 2 is a fragmentary cross-sectional view through a modified design of fire alarm or detector where there can be altered the internal air access or entry openings;

FIG. 3 is a cross-sectional view through a fire detector alarm at which there can be simultaneously changed or altered the external and internal air access or entry openings;

DETAILED DESCRIPTION OF THE PREFERRED EMBODIMENTS

Figure 4C:
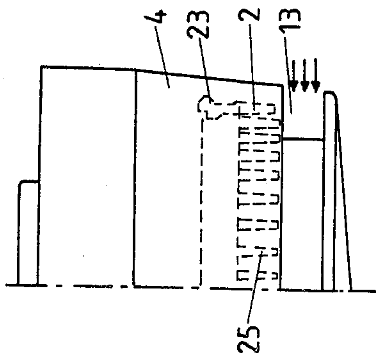
FIG. 4*c* is a fragmentary side view, similar to the showing of FIG. 4*b*, but depicting the hood ring member located in its upper end or terminal position analogous to the showing at the right side of FIG. 4*a*.

Describing now the drawings, in FIG. 1 here is illustrated by way of example and not limitation an ionization fire alarm composed of a socket or mounting portion 1 and a fire alarm insert 2. The socket portion or member 1 is laterally provided with a recess or opening **1*a* into which here can be conveniently fitted any suitable alarm indication lamp 3** or other appropriate alarm indicator, for instance a luminescent diode.

The alarm insert or insert unit 2 comprises a housing 4, 5 composed of a substantially cylindrical or slightly conical sleeve member 4 and a lower cover member 5. Between the sleeve member 4 and the cover member 5 there is located a substantially ring-shaped or annular slot 13 for the entry of air into the interior of the housing 4, 5. At the inside of the cover member 5 there is provided a substantially cylindrical web 12, by means of which there can be braked the inflowing air and such dammed-up before it reaches the interior of the housing 4, 5. A manually adjustable device, here shown for instance as a ring member 15 is located at the cylindrical web 12. The ring member 15 can be selectively displaced in axial direction such that the ring-shaped slot 13 or equivalent structure, forming the outer or external air entry or access opening, can be changed in its width. To this end, the ring member 15 and outer wall of the web 12 can be respectively provided with standard internal and external threading, generally indicated by reference character 50 to enable infinite or stepwise adjustment of the ring member 15 axially along the web 12, and thus control of the size of the air entry opening 13.

In the interior of the housing 4, 5 there is arranged a carrier or support plate 6 formed of a suitable insulating material at which there are mounted all of the further components of the fire alarm or smoke detector. A central bore **6*a* contains a metal punch or plunger 7 or equivalent structure which carries a substantially disc-shaped inner electrode 8 provided with a suitable radioactive preparation or substance 9. At the underside 6*b* of the support plate 8 there is further mounted a counter electrode 11 formed as a wire grid having numerous small openings, which have not been particularly shown but are conventional and as is well known in this technology. The counter electrode 11 surrounds the inner electrode 8 and protects such against contact. This inner or intermediate electrode 8 and the counter electrode 11 define the ionization chamber 10. Above the support plate 6 there can be provided a conventional electrical circuit for evaluation of the changes in ionic current flow within the ionization chamber 10. The ionization measuring chamber 10 can be provided with a standard reference-ionization chamber which is almost completely obturated from the ambient atmosphere and which in conventional manner is connected in series with the ionization chamber 10. The cover member or cover 5 of the housing, 4, 5 is advantageously designed such that it can be removed from the housing portion or sleeve member 4** in order to facilitate cleaning of the smoke detector.

FIG. 2 is a fragmentary sectional view of a further embodiment of fire alarm or detector possessing the same technological advantages discussed above, wherein there is located at the inner wall 4*a* of the housing portion or sleeve member 4 a projection or protuberance 16 which ensures for a further deflection of the incoming air. In order to accommodate the smoke detector to different environmental or ambient conditions there is located at the inner side or surface 12*a* of the web 12 a displaceable adjustment cylinder 17 or the like which either adheres in a force-locking or frictional manner, due to the action of a certain pre-bias, at the inner wall 12*a* of the cylinder-shaped web 12, e.g. by forming the cylinder of a suitable elastic or resilient material, such as a plastics material, or which may be secured by not particularly illustrated but conventional attachment springs at a number of locations of the circumference at the outer side of the web or web member 12. By axially displacing the adjustment cylinder 17 it is possible to change the inner or internal air entry opening 20 of the smoke alarm. To provide for an infinite or stepwise change in the air entry cross-sectional area there also could be provided at the inner side of the web 12 grooves into which engage corresponding projections of the cylinder 17, or there can be provided appropriate grooves at the outer side of the web 12 in which there can engage corresponding projections of the attachment springs. Obviously, any other suitable measures may be employed for displaceably mounting the cylinder 17 for movement along the web 12.

FIG. 3 illustrates in fragmentary cross-sectional view a still further embodiment of fire alarm also having the same technological advantages as described heretofore, wherein at the inner side of the housing portion or sleeve member 4 there is provided a projection or protuberance 16 causing a further deflection of the incoming or entering air. In order to accommodate the smoke detector to different environmental or ambient conditions there is arranged at the outer side of the web 12 a substantially cylindrical adjustment ring member or ring 18 provided with a flange 19. The cylindrical ring 18 is arranged to be axially displaceable upon the web 12 in any convenient fashion, for instance as heretofore described in detail. For the infinite adjustment of the cylindrical ring 18 there also may be formed grooves or depressions at the web 12 into which there can engage appropriate projections of the cylindrical ring 18. During axial displacement of the cylindrical adjustment ring 18 there is simultaneously altered the cross-sectional area or size of the outer air entry opening 13 by the flange 19 and the inner air entry opening 20 by the upper edge or upright portion 60 of the cylinder or cylindrical ring 18. As shown schematically in FIG. 3, but equally useable in the arrangements of FIGS. 1 and 2, a suitable marker 70, such as a scale can be provided to visually indicate the position of the manually operated adjustment ring or the like or equivalent structure.

FIGS. 4*a*, 4*b*, 4*c* and 4*d* illustrate a further exemplary embodiment of a smoke detector including its fire alarm insert, wherein, here also, there can be altered the outer air entry or access openings 13. To simplify the illustration there has been conveniently omitted the socket or mounting portion for mounting the fire alarm insert 2, but such socket or mounting portion may be constructed similar to the socket or mounting portion 1 of the arrangement of FIGS. 1 to 3. In contrast to the embodiment of FIG. 1, here the change or alteration of the air entry openings 13 is not accomplished by displacing a ring or ring member 15 which is attached to the cylindrical web 12, rather by displacing a hood ring or ring member 21 which is displaceably secured to the inside of the sleeve or sleeve member 4 of the housing 4, 5.

Figure 4A:
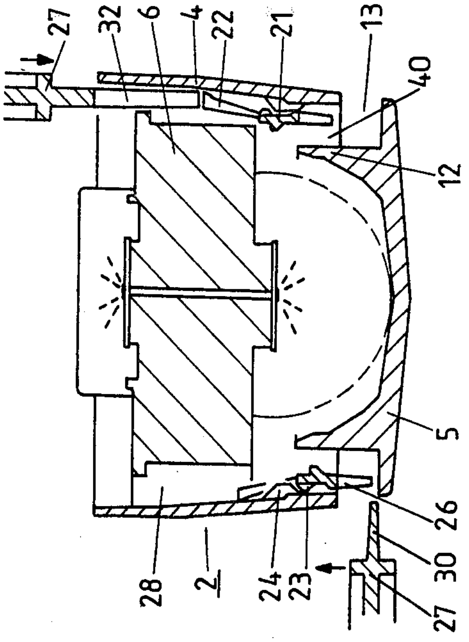
FIG. 4*a* illustrates in axial sectional view a further embodiment of smoke detector, wherein in the left-hand portion of the illustration there have been depicted the air entry openings reduced in size, whereas in the right-hand portion thereof the air entry openings have been depicted in their greater opened or enlarged state.

As will be understood by inspecting FIG. 4*a*, at the left-hand portion of the cross-sectional illustration appearing therein the air entry openings 13 have been shown reduced in size, whereas in the right-hand portion of such illustration such air entry openings 13 have been shown in their more open or enlarged state.

It will be also recognized that the alarm insert or insert unit 2 likewise comprises the housing 4, 5 composed of a cylindrical or slightly conical sleeve member 4 and a lower cover member 5 integrated or connected with the conical sleeve member 4 by a number of circumferentially spaced and radially extending web portions 40 as shown in FIG. 4*a*. Between the sleeve member 4 and the cover member 5 there is located a substantially ring-shaped or annular slot 13, defining the air entry opening or openings 13 for the entry of the air into the housing 4, 5. At the inner side or surface of the sleeve member 4 there is located an axially displaceable hood ring or ring member 21. This hood ring member 21 is preferably retained by at least three pairs of finger-like upwardly protruding webs 22 arranged in such pairwise configuration about the circumference of the hood ring member 21, these pairs of webs 22 being appropriately guided by suitable guide or mounting webs 36 arranged at the circumference of the inner surface of the sleeve member 4. These guide webs 36 may possess a substantially inverted U-shaped configuration in coacting relationship, with a related pair of upwardly protruding webs 22 such that the downwardly extending legs 38 of each guide web are straddled by such pair of webs 22 which may slide along the outer surface of such legs or leg members 38. At the central region between two operatively associated or pair of webs 22 there is located in each case at the hood ring member 21 an outwardly directed or projecting nose member 23. At the inside of the sleeve member 4 there is provided in each case at the same location of the circumference an beneath the related U-shaped guide web 36 a nose-like projection or dog 24 which extends radially towards the inside. Upon displacement in axial direction the radially projecting nose members 23 of the hood ring member 21, which is beneficially fabricated from a suitable elastic or resilient material, slide over and past the related nose-like projections 24 and fix the hood ring member 21 in its lower terminal position or upper terminal position, as the case may be.

Figure 4B:
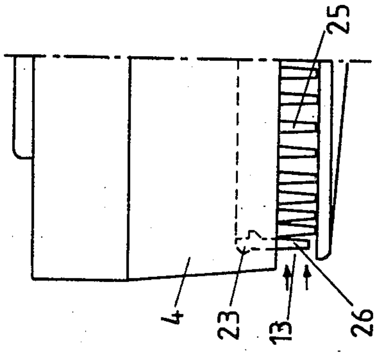
FIG. 4*b* is a fragmentary side view of the smoke detector shown in FIG. 4*a* depicting the hood ring member thereof located in its lower terminal position analogous to the showing at the left side of FIG. 4*a*.
Figure 5:
FIG. 5 is a top plan view showing details of one possible form of adjustment tool which can be used in connection with the smoke detector depicted in FIGS. 4*a*, 4*b* and 4*c*.
Figure 4D:
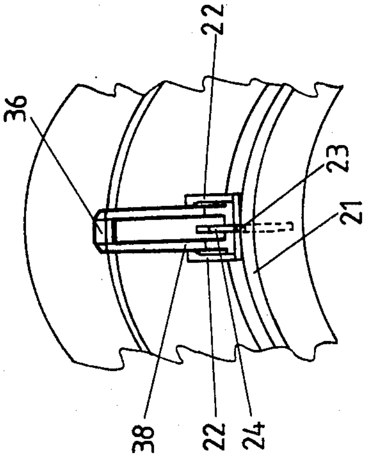
FIG. 4*d* is a fragmentary front detail view, looking from the inside of the smoke detector, depicting details of the mounting arrangement for displaceably mounting the hood ring member at the inner surface or wall of the alarm insert unit.

FIG. 4*b* illustrates in fragmentary side view details of the fire alarm insert or insert unit 2. The hood ring member 21 arranged internally of the sleeve member 4 is located in its lower terminal or end position. In this case the ring-shaped slot 13 defining the openings for the entry of the air into the housing 4, 5 has been reduced in size by the protruding spaced teeth 25, 26 arranged about the entire circumference of the axially displaceable hood ring member 21 and defining a grill or grate structure. To prevent the hood ring member 21 from dropping down too far in the direction of the cover member 5, the radially protruding ribs 40 in each case advantageously extend between a neighboring pair of the downwardly protruding spaced teeth of the hood ring member 21.

On the other hand, in FIG. 4c there is depicted, somewhat analogous to the showing of FIG. 4b, a fragmentary side view of the fire alarm insert or insert unit 2, wherein, however, the hood ring member 21 is located in its upper terminal position, so that there is available for the entry of the air the full size of the openings of the ring-shaped slot 13. The position of the hood ring member 21 internally of the sleeve member 4 has been indicated by broken lines.

The teeth 25, 26 of the hood ring member 21 are advantageously not all of the same length. It will be understood that each of the teeth 26, which are located in each instance approximately at the center between a pair of coacting webs 22 and its related inverted U-shaped guide, are somewhat shorter, so that for the axial displacement of the hood ring member 21 into the upper terminal position of FIG. 4c it is possible to successively engage the pointed part 30 of a special tool 27 beneath each of such shorter teeth 26 and to upwardly shift the hood ring member 21 into its upper terminal or 19 retracted position as shown in such FIG. 4c. In order to displace the hood ring member 21 into the lower terminal position of FIG. 4b the bifurcated or fork-like portion 32 of the special tool 27 successively engages into the circumferentially spaced, elongated gaps or slots 28 located between the sleeve member 4 and the support plate 6 and disposed in each case above the related pair of webs 22 and presses upon the upper ends of these webs 22 until the corresponding nose member 23 slides over and past the coacting projection 24, whereby the hood ring member 21 can be downwardly shifted so as to assume the lower terminal position shown in FIG. 4b. During such time as the bifurcated portion 32 of the special tool 27 is inserted into one of the circumferentially spaced elongated slots 28 the bifurcated or fork-like portion 32 straddles the corresponding inverted U-shaped guide or mounting web 36, and thus is effectively guided thereby so that it positively engages with the related pair of upwardly protruding webs 22 which, as will be recalled, likewise straddle the downwardly depending legs 38 of such inverted U-shaped guide or mounting web 36.

The exemplary embodiments described above in connection with the various figures and disclosed in conjunction with ionization fire or smoke alarms can be equally employed in analogous fashion in conjunction with optical smoke alarms. Apart from the embodiments disclosed heretofore and discussed in connection with FIGS. 1 to 5 it is also possible to construct fire alarms having an outer and inner portion serving for air deflection purposes, for instance as disclosed for the fire alarm or detector described in Swiss Pat. No. 475,614, such that either the openings of the outer or inner part of the casing can be altered by means of a mechanical adjustment device. The alteration or change of the inlet openings also can be accomplished such that parts of the outer and inner encasements or casings, located opposite one another, contact one another and possess air entry openings. In this connection the openings are arranged such that upon rotation of the enclosures or casings towards one another there is accomplished a corresponding enlargement or reduction in size of the air entry openings. Apart from these adjustable openings it is possible for a portion of the openings to be retained at parts of the casings or enclosures which do not contact one another.

While there are shown and described present preferred embodiments of the invention, it is to be distinctly understood that the invention is not limited thereto, but may be otherwise variously embodied and practiced within the scope of the following claims. Accordingly,

What I claim is:

1. A smoke detector comprising:

a housing enclosing at least one smoke measuring chamber;

said housing being provided with at least one opening for the entry of ambient air into the smoke measuring chamber;

said housing comprising a sleeve member and a cover member defining therebetween said air entry opening;

manually adjustable means for changing the air entry opening in order to accommodate the smoke detector to different ambient atmospheric conditions; and said manually adjustable means including a hood ring member displaceably supported by said sleeve member.

2. The smoke detector as defined in claim 1, wherein:

said hood ring member is structured for changing the cross-sectional area of the air entry opening of the smoke detector to accommodate the smoke detector to the degree of contamination of the surrounding atmosphere.

3. The smoke detector as defined in claim 2, wherein:

said hood ring member has a lower portion containing downwardly protruding spaced teeth which can be selectively positioned in a retracted or extended position with respect to said sleeve member so as to selectively change the cross-sectional area of the air entry opening of the smoke detector.

4. The smoke detector as defined in claim 3, wherein:

said spaced teeth comprise two types of teeth having respectively different lengths and defining shorter teeth and longer teeth; and said shorter teeth permitting insertion of a special tool for displacement of the hood ring member into an upper terminal position defines said retracted position.

5. The smoke detector as defined in claim 1, further including:

a support plate arranged internally of said sleeve member and cooperating therewith to define therebetween at least one slot through which there can be inserted a tool for downwardly displacing the hood ring member towards the cover member in order to decrease the cross-sectional area of the air entry opening of the smoke detector.

6. The smoke detector as defined in claim 5, wherein:

said hood ring member includes at least one pair of upwardly extending webs directed towards said slot and capable of being contacted by the tool inserted through said slot in order to downwardly displace the hood ring member.

7. The smoke detector as defined in claim 1, wherein:

said hood ring member and said sleeve member possess coacting means for displaceably mounting said hood ring member within said sleeve member so as to move in the axial direction thereof between predetermined upper and lower positions.

8. The smoke detector as defined in claim 7, wherein:

said coacting means comprise guide webs arranged at the circumference of an inner surface of the sleeve member and protruding web members provided at the hood ring member and coacting with said guide webs at the inner surface of said sleeve member.

9. The smoke detector as defined in claim 8, wherein said coacting means further comprise:

projecting nose means provided at said hood ring member;

projection means provided at the inner surface of said sleeve member and cooperating with said projecting nose means; and said projecting nose means sliding over said projection means during such time as said hood ring member is axially displaced within the sleeve member.

* * * * *

UNITED STATES PATENT AND TRADEMARK OFFICE

CERTIFICATE OF CORRECTION

PATENT NO. : 4,475,390

DATED : October 9, 1984

INVENTOR(S) : ANDREAS SCHEIDWEILER

It is certified that error appears in the above—identified patent and that said Letters Patent is hereby corrected as shown below:

Title page:

In the Abstract, line 11, at the beginning of the line delete "opening" and replace by --openings--

Column 1, line 68, delete "468,638" and replace by --468,683--

Column 2, line 1, after "and" (first occurrence) insert --Swiss Patents Nos.--

Column 7, line 25, after "or" please delete "19"

Signed and Sealed this

*Thirtieth* Day of *April 1985*

[SEAL]

*Attest:*

DONALD J. QUIGG

*Attesting Officer* *Acting Commissioner of Patents and Trademarks*